United States Patent
Thankappan et al.

(10) Patent No.: US 10,761,895 B2
(45) Date of Patent: Sep. 1, 2020

(54) SELECTIVE ALLOCATION OF PHYSICAL COMPUTING RESOURCES AMONGST VIRTUAL MACHINES BASED ON USER ATTRIBUTE VALUES CONTAINED IN USER PROFILES

(71) Applicant: VMWARE, INC., Palo Alto, CA (US)

(72) Inventors: Sudhish Panamthanath Thankappan, Bangalore (IN); Sivaprasad K. Govindankutty, Bangalore (IN); Jubish Kulathumkal Jose, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 445 days.

(21) Appl. No.: 14/037,374

(22) Filed: Sep. 26, 2013

(65) Prior Publication Data
US 2015/0089496 A1  Mar. 26, 2015

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01)

(58) Field of Classification Search
CPC .............. G06F 9/5005; G06F 9/45533; G06F 9/45537; G06F 2009/4557; G06F 2009/45562
See application file for complete search history.

(56) References Cited

U.S. PATENT DOCUMENTS

| | | | |
|---|---|---|---|
| 6,760,903 B1 | 7/2004 | Morshed | |
| 7,225,462 B2* | 5/2007 | Bass et al. | 726/6 |
| 7,577,959 B2 | 8/2009 | Nguyen et al. | |
| 8,191,086 B2 | 5/2012 | Sandland | |
| 8,260,840 B1 | 9/2012 | Sirota et al. | |
| 8,271,644 B2 | 9/2012 | Radhakrishnan et al. | |
| 8,321,558 B1 | 11/2012 | Sirota et al. | |
| 8,429,276 B1 | 4/2013 | Kumar | |
| 8,560,671 B1 | 10/2013 | Yahalom et al. | |
| 8,789,041 B2 | 7/2014 | Verma | |
| 2002/0059274 A1 | 5/2002 | Hartsell | |
| 2002/0083110 A1 | 6/2002 | Kozuch | |
| 2005/0262504 A1 | 11/2005 | Esfahany et al. | |
| 2006/0184935 A1* | 8/2006 | Abels | G06F 9/5077 718/1 |
| 2006/0200821 A1 | 9/2006 | Cherkasova | |

(Continued)

*Primary Examiner* — Meng Ai T An
*Assistant Examiner* — Zujia Xu

(57) ABSTRACT

Techniques for resource allocation are described. Some embodiments provide a computing system and method for resource allocation in a virtualized computing environment comprising at least one physical computing system hosting multiple virtual machines, that performs at least some of the described techniques. In one embodiment, a user connection server is configured to receive a request for allocation of a virtual machine, for a user. The user connection server determines an attribute value of the user. Based on the attribute value of the user, allocation of physical computing resources for the virtual machine is determined. A management server is configured to boot the virtual machine for access by the user, the virtual machine booted with the determined allocation of physical computing resources for the virtual machine.

18 Claims, 8 Drawing Sheets

(56) References Cited

U.S. PATENT DOCUMENTS

| | | | |
|---|---|---|---|
| 2007/0171921 A1 | 7/2007 | Wookey | |
| 2007/0250833 A1* | 10/2007 | Araujo et al. | 718/1 |
| 2007/0300221 A1* | 12/2007 | Hartz | G06F 3/1222 718/1 |
| 2008/0192763 A1 | 8/2008 | Davis | |
| 2008/0229031 A1 | 9/2008 | Villarreal | |
| 2010/0223368 A1* | 9/2010 | Runcie | G06F 9/45533 709/222 |
| 2010/0306163 A1 | 12/2010 | Beaty | |
| 2010/0325261 A1 | 12/2010 | Radhakrishnan et al. | |
| 2010/0325278 A1* | 12/2010 | Heim | G06F 9/4416 709/226 |
| 2011/0125895 A1 | 5/2011 | Anderson et al. | |
| 2011/0126197 A1 | 5/2011 | Larsen et al. | |
| 2011/0145506 A1 | 6/2011 | Cherukuri | |
| 2011/0153838 A1 | 6/2011 | Belkine | |
| 2011/0154320 A1 | 6/2011 | Verma | |
| 2011/0209156 A1 | 8/2011 | Box | |
| 2011/0251992 A1* | 10/2011 | Bethlehem | H04L 12/2863 707/610 |
| 2011/0258481 A1* | 10/2011 | Kern | 714/4.1 |
| 2012/0036251 A1 | 2/2012 | Beaty | |
| 2012/0044519 A1* | 2/2012 | Wu | H04N 1/00222 358/1.15 |
| 2012/0054409 A1 | 3/2012 | Block et al. | |
| 2012/0089666 A1* | 4/2012 | Goswami | G06Q 10/103 709/203 |
| 2012/0166624 A1 | 6/2012 | Suit | |
| 2012/0246646 A1 | 9/2012 | Bakman | |
| 2013/0080619 A1* | 3/2013 | Assuncao et al. | 709/224 |
| 2013/0086235 A1 | 4/2013 | Ferris | |
| 2013/0311662 A1 | 11/2013 | Stolyar | |
| 2013/0346618 A1 | 12/2013 | Holkkola | |
| 2014/0052864 A1 | 2/2014 | Van Der Linden et al. | |
| 2014/0059229 A1 | 2/2014 | Parikh | |
| 2014/0173591 A1* | 6/2014 | Lin | G06F 9/45533 718/1 |
| 2014/0250436 A1 | 9/2014 | Tang et al. | |
| 2014/0282529 A1 | 9/2014 | Bugenhagen | |
| 2014/0372553 A1* | 12/2014 | Blackburn | H04L 67/10 709/217 |
| 2016/0041839 A1* | 2/2016 | Wright | H04L 63/0823 718/1 |

\* cited by examiner

VIRTUAL MACHINE CONFIGURATION FILE VMX1 — 144

```
POWERTYPE . POWEROFF = "SOFT"
POWERTYPE . POWERON = "HARD"
POWERTYPE . SUSPEND = "HARD"
POWERTYPE . RESET = "SOFT"
DISPLAYNAME = "LEGACY-VM-FORMAT"
EXTENDEDCONFIGFILE = "LEGACY-VM-FORMAT . VMXF"
FLOPPY0 . PRESENT = "TRUE"
NUMVCPUS = "2"                                              ← 152
SCSI0 . PRESENT = "TRUE"
SCSI0 . SHAREDBUS = "NONE"
MEMSIZE = "2048"                                            ← 154
SCSI0 : 0 . PRESENT = "TRUE"
SCSI0 : 0 . FILENAME = "/VMFS/VOLUMES/50AA73B0-6A1EBC32-69CB-E41F13809211/
SCSI0 : 0 . DEVICETYPE = "SCSI-HARDDISK"
IDE0 : 0 . PRESENT = "TRUE"
IDE0 : 0 . CLIENTDEVICE = "TRUE"
```

FIG. 2A

VIRTUAL MACHINE CONFIGURATION FILE VMXc ~146

POWERTYPE . POWEROFF = "SOFT"
POWERTYPE . POWERON = "HARD"
POWERTYPE . SUSPEND = "HARD"
POWERTYPE . RESET = "SOFT"
DISPLAYNAME = "FLEXI-VM-FORMAT"
EXTENDEDCONFIGFILE = "FLEXI-VM-FORMAT"
FLOPPY0 . PRESENT = "TRUE"
NUMVCPUS = "CUSTOM"   ~152
SCSI0 . PRESENT = "TRUE"
SCSI0 . SHAREDBUS = "NONE"
SCSI0 . VIRTUALDEV = "PVSCSI"
MEMSIZE = "CUSTOM"   ~154
SCSI0 : 0 . PRESENT = "TRUE"
SCSI0 : 0 . FILENAME = "/VMFS/VOLUMES/50AA73B0-6A1EBC32-69CB-E41F13809211/
SCSI0 : 0 . DEVICETYPE = "SCSI-HARDDISK"
IDE0 : 0 . PRESENT = "TRUE"
IDE0 : 0 . CLIENTDEVICE = "TRUE"

ATTRIBUTE SELECTION — 119, 406

| ATTRIBUTE | SELECTION |
|---|---|
| JOB TITLE | YES |
| DEPARTMENT | NO |
| ATT-3 | NO |
| ATT-4 | NO |

GLOBAL SETTING: LOOKUP ATTRIBUTE = <JOB TITLE> — 120, 420, 418, 416

| RPT ID | ATTRIBUTE | MEMORY IN GB | NUMVCPUS |
|---|---|---|---|
| RPT - 1 | ARCHITECT | 8 | 16 |
| RPT - 2 | ENGINEER | 4 | 8 |
| RPT - 3 | MANAGER | 4 | 4 |
| DEFAULT | | 2 | 2 |

414, 422, 424

```
520
CONFIG . VERSION = "8"
VIRTUALHW . VERSION = "9"
SCSI0 . PRESENT = "TRUE"
SCSI0 . VIRTUALDEV = "LSISAS1068"
MEMSIZE = "8 GB"                    — 524
MEM . HOTADD = "TRUE"
NUMVCPUS = "16"                     — 522
SCSI0 : 0 . PRESENT = "TRUE"
SCSI0 : 0 . FILENAME = "WINDOWS 8 – C11 . VMDK"
IDE1 : 0 . PRESENT = "TRUE"
IDE1 : 0 . FILENAME = "AUTO DETECT"
DIE1 : 0 . DEVICETYPE = "CDROM-RAW"
FLOPPY0 . FILETYPE = "DEVICE"
FLOPPY0 . FILENAME = " "
FLOPPY0 . CLIENTDEVICE = "FALSE"
ETHERNET0 . PRESENT = "TRUE"
ETHERNET0 . VIRTUALDEV = "E1000E"
ETHERNET0 . WAKEONPCKTRCV = "FALSE"
ETHERNET0 . ADDRESSTYPE = "GENERATED"
```

FIG. 5A

SELECTIVE ALLOCATION OF PHYSICAL COMPUTING RESOURCES AMONGST VIRTUAL MACHINES BASED ON USER ATTRIBUTE VALUES CONTAINED IN USER PROFILES

BACKGROUND

Existing approaches to resource allocation in a virtualized computing environment are typically based on relatively static and/or coarse-grained decisions about the expected workload to be processed within the virtualized computing environment. A virtualized computing environment typically includes multiple physical computing systems that each includes a hypervisor, virtual machine monitor, or similar logic that is configured to manage the concurrent execution of multiple virtual machines (VMs). Each virtual machine may have a distinct guest operating system and corresponding applications.

When a virtual machine is created, it may be assigned or given access to some portion of the physical resources of its host physical computing system. Typically, the amount of physical resources (e.g., a central processing unit (CPU) or memory) is allocated based on a preset value, without regard to specific user profile or specific group needs. For example, many organizations simply utilize a "one size fits all" approach to resource allocation, and provide a uniform resource set for virtual machines allocated for different users or uses. Such uniform allocation, while simple and seemingly fair, does not consider the actual computing needs of those users, which may vary dramatically based on differing roles they may play in an organization. Such uniform allocation decisions may result in a collection of virtual machines that may not be closely matched to their actual computing requirements, in that some virtual machines do not have sufficient resources, while others are allocated excess resources based on under utilization of the resources by the user.

BRIEF DESCRIPTION OF THE DRAWINGS

FIGS. 2A-2B illustrate example virtual machine configuration files, according to example embodiments.

FIG. 4A illustrate example construction of a resource configuration template (RCT) table, according to an example embodiment.

FIG. 4B illustrate example construction of a resource profile template (RPT) table, according to an example embodiment.

FIG. 5A illustrate example virtual machine configuration file of a virtual machine with a designated virtual machine identification (VMID) with custom values, according to an example embodiment.

DETAILED DESCRIPTION

Embodiments described herein provide enhanced computer- and network-based methods, techniques, and systems for allocating physical computing resources amongst multiple virtual machines (VMs) executing on a physical computing system, based on attributes associated with a user requesting a virtual machine. Allocating physical computing resources may include allocating access to or shares of hardware devices or elements of a physical computing system, including processing resources (e.g., central processing unit (CPU) resources), memory resources (e.g., random access memory (RAM)), input/output resources (e.g., disk bandwidth), network resources (e.g., network bandwidth), or the like. The physical computing resources may be allocated selectively based on one or more attributes associated with a user requesting a virtual machine. The amount or level of resources that are made available to a particular virtual machine may be configurable, for example, by an administrator, based on various attributes and needs of a user, groups of users or an organization and the like.

Example embodiments provide a computing system and method for resource allocation in a virtualized computing environment comprising at least one physical computing system hosting multiple virtual machines, that performs at least some of the described techniques. In one embodiment, a user connection server is configured to receive a request for allocation of a virtual machine, for a user. The user connection server determines an attribute value of the user. Based on the attribute value of the user, allocation of physical computing resources for the virtual machine is determined. A management server is configured to allocate physical computing resources for the virtual machine, based on the determined allocation.

System Overview and Examples of Operation

Figure 1:
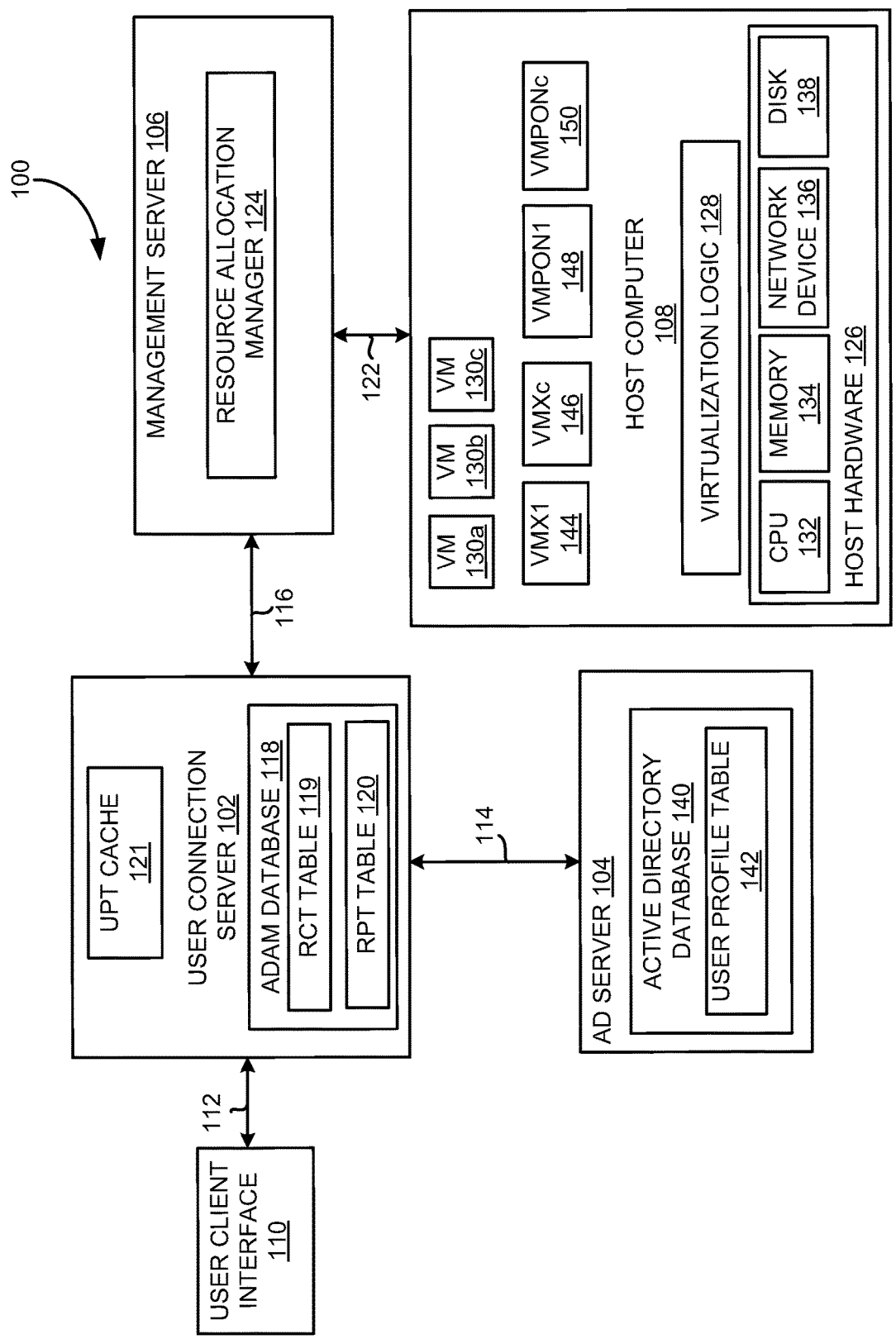
FIG. 1 is an example block diagram illustrating a system for processing a request for a virtual machine, according to an example embodiment.

FIG. 1 is an example block diagram 100 illustrating a system for processing a request for a virtual machine, according to an example embodiment. In particular, FIG. 1 depicts user connection server 102, active directory (AD) server 104, management server 106 and host computer 108.

User connection server 102 communicates with a user through user client interface 110, over link 112. User client interface 110 is used by a user to submit a request for a virtual machine. The request for the virtual machine is sent by user client interface 110 to user connection server 102 over link 112. User connection server 102 further includes active directory application mode (ADAM) database 118. ADAM database 118 stores resource configuration template table 119 (referred to herein as RCT table 119) and resource profile template table 120 (referred to herein as RPT table 120). ADAM is a lightweight data access protocol (LDAP) enabled directory service that is available from Microsoft, and while the present example specifies an ADAM database, any LDAP server or other database service can be used instead. Although shown as integrated with user connection server 102, ADAM database 118 may run in a separate server and be accessed using LDAP, remote procedure calls (RPC), or the like. Example construction of RCT table 119 and RPT table 120 will be later described with reference to FIGS. 4A and 4B, respectively. User connection server 102 may also have user profile template (UPT) cache 121, function and feature of which will be further described with reference to FIG. 5 and FIG. 5B. User connection server 102 also communicates with AD server 104 over link 114. AD server 104 includes active directory database 140. Active directory database 140 includes one or more user profile tables 142. User profile table 142 contains one or more attributes of a user. An example user profile of a user will be further described with reference to FIG. 3.

User connection server 102 further communicates with management server 106 over link 116. Management server 106 communicates with host computer 108 over link 122. Management server 106 includes resource allocation manager 124. Resource allocation manager 124 allocates physical computing resources of one or more host computers 108. Each host computer 108 includes host hardware 126, virtualization logic 128, and multiple virtual machines 130a-130c. Although only three virtual machines 130a-130c are shown, it should be recognized that any number of virtual machines may reside on each of any number of host computers 108.

Host computer 108 further includes one or more virtual machine configuration files for example, VMX1 144 and VMXc 146. Virtual machine configuration file VMX1 144 may correspond to a static resource allocation for a virtual machine. Virtual machine configuration file VMXc 146 may correspond to a dynamic resource allocation for a virtual machine. Virtual machine configuration files VMX1 144 and VMXc 146 will be further described with reference to FIGS. 2A and 2B, respectively. Further, host computer 108 includes one or more virtual machine power on processes, VMPON1 148 and VMPONc 150. Virtual machine power on process VMPON1 148 may correspond to powering on a virtual machine with static resource allocation. Virtual machine power on process VMPONc 150 may correspond to powering on a virtual machine with dynamic resource allocation.

Resource allocation manager 124 allocates the physical resources of host computer 108 amongst virtual machines 130a-130c. Physical resources allocated include elements of host hardware 126, including CPU 132, memory 134, network device 136, and disk 138. In one example embodiment, resource allocation manager 124 reads appropriate virtual machine configuration file (for example, VMX1 144 or VMXc 146) and invokes appropriate virtual machine power on process (VMPON1 148 or VMPONc 150) to power on a virtual machine in host computer 108.

Note that while resource allocation manager 124 is here shown executing on management server 106, resource allocation manager 124 may be executed elsewhere in other embodiments. For example, resource allocation manager 124 may execute on one of virtual machines 130a-130c. As another example, some or all of the functions of resource allocation manager 124 may be performed within virtualization logic 128. In some embodiments, resource allocation manager 124 is not a centralized manager as shown, and resource allocation decisions are instead made locally (e.g., within virtualization logic 128 of host computer 108), possibly based on information received from other localized managers using a peer-to-peer distribution model.

Management server 106 may be or execute a commercially available virtual machine management system, such as VMware® vCenter™, available from VMware Inc., Microsoft System Center® by Microsoft Corp., Citrix Xen-Center® by Citrix Inc., or the like. User connection server 102 may be part of a virtual desktop infrastructure (VDI) or similar management system, such as VMware Horizon View®, available from VMware, Inc. Virtualization logic 128 may be or include a hypervisor such as VMware vSphere Hypervisor™ available from VMware, Xen-Server® available from Citrix, Microsoft Hyper-V Server available from Microsoft Corporation, or the like.

FIG. 2A illustrates an example virtual machine configuration file VMX1 144. Configuration file VMX1 144 has various attributes for a virtual machine and their corresponding values. For example, attribute 152 refers to attribute "NUMVCPUS" with a corresponding value of "2". Attribute "NUMVCPUS" refers to a number of virtual CPUs allocated to the virtual machine and in this example, 2 CPUs are allocated to the virtual machine. As another example, attribute 154 refers to attribute "MEMSIZE" with a corresponding value of "2048". Attribute "MEMSIZE" refers to a memory size allocated to the virtual machine and value of "2048" corresponds to a memory size of 2048 MB or 2 GB. In this example, all the attributes for a virtual machine are already preset. So, when a virtual machine is powered on by using virtual machine configuration file VMX1 144, corresponding virtual machine will be allocated 2 CPUs and 2 GB of memory.

FIG. 2B illustrates an example virtual machine configuration file VMXc 146. Virtual machine configuration file VMXc 146 has various attributes for a virtual machine and their corresponding values. However, virtual machine configuration file VMXc 146 is different than virtual machine configuration file VMX1 144 in that attribute 152 which refers to attribute "NUMVCPUS" has a corresponding value of "CUSTOM" instead of a set value. Attribute "NUMVCPUS" refers to a number of CPUs allocated to the virtual machine and in this example, the number of CPUs allocated to the virtual machine will vary, based on one or more attributes of the user or groups of user. As another example, attribute 154 which refers to attribute "MEMSIZE" has a corresponding value of "CUSTOM" instead of a set value. Attribute "MEMSIZE" refers to the memory size allocated to the virtual machine and in this case, the memory allocated to the virtual machine will vary, based on one or more attributes of the user or group of users.

In this example, as some of the attributes for a virtual machine are not preset, resource allocation manager 124 has to pass on the specific value for fields that are identified as "CUSTOM". System and method for passing specific value for fields that are identified as "CUSTOM" will be later described in detail.

Figure 3:
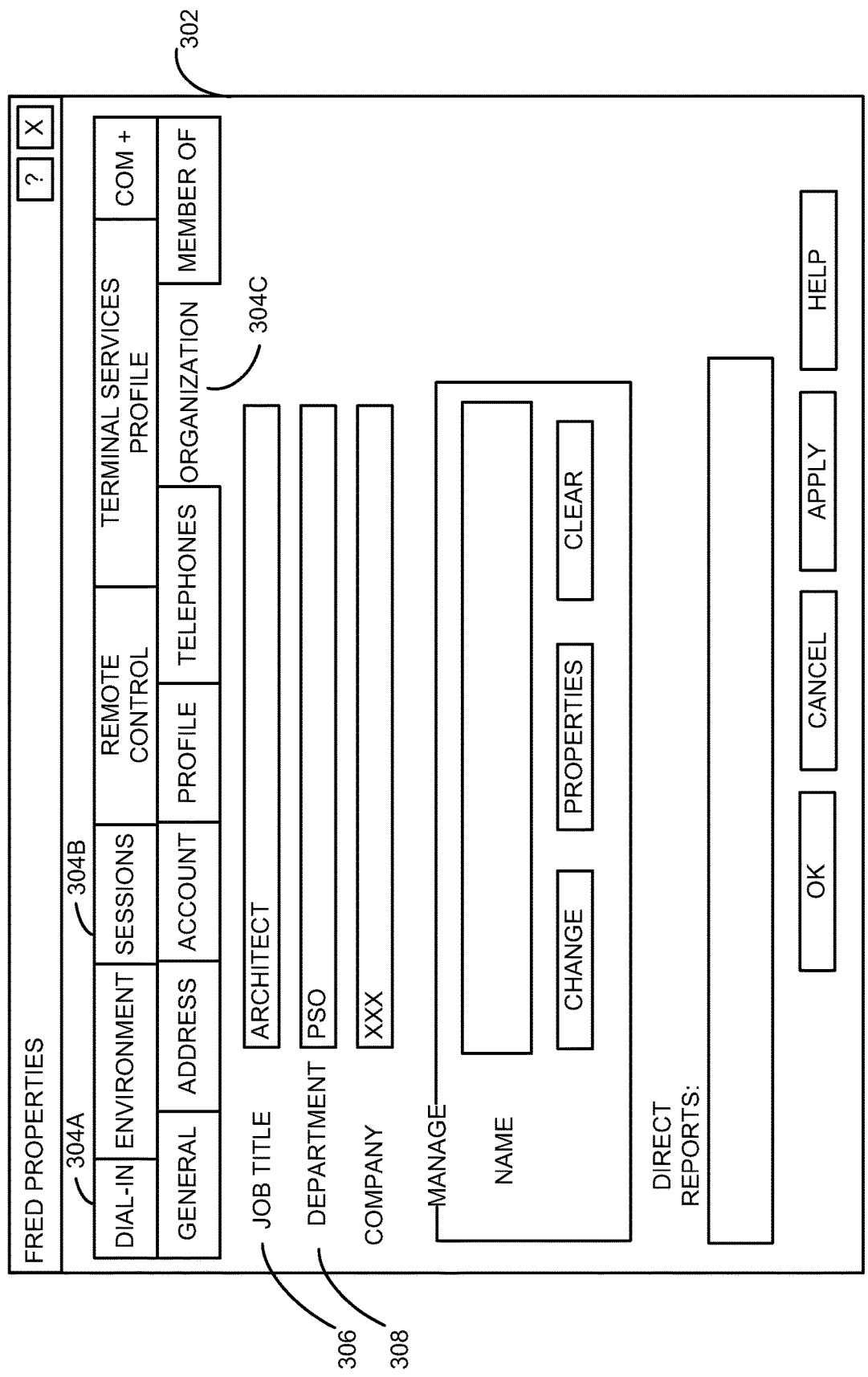
FIG. 3 illustrate example user profile of a user, according to an example embodiment.

Now referring to FIG. 3, an example user profile of a user will be further described. Example user profile data is presented in screen shot 302. User profile data contain one or more attributes of a user, for example, user FRED. Now referring to screen shot 302, the user profile data is divided under various headings or tabs, for example, headings 304A, 304B and 304C. When a heading is selected, additional user profile data is displayed. For example, under heading 304C named "ORGANIZATION", various attributes of user FRED is displayed. For example, FRED's JOB TITLE 306 is "ARCHITECT". As another example, FRED's DEPARTMENT 308 is "PSO". If FRED is the user requesting a virtual machine, then, one or more attributes of FRED may be used to determine specific resources to be allocated while powering on the virtual machine.

Now, referring to FIG. 4A, example construction of RCT table 119 will be described. RCT table 119 shows which attribute of a user needs to be selected for assigning custom resources. Referring to FIG. 4A, in RCT table 119, column 404 refers to ATTRIBUTE and column 406 refers to SELECTED. Now, referring to row 408, corresponding attribute is "JOB TITLE" and "SELECTED" field shows "YES". This indicates that custom resources are allocated to a virtual machine, based on the attribute "JOB TITLE". Now referring to row 410, corresponding attribute is "DEPARTMENT" and "SELECTED" field shows "NO". This indicates that attribute "DEPARTMENT" is not used to allocate custom resources to a virtual machine. Although only two attributes are shown, as one skilled in the art appreciates, additional attributes may be listed along with their selection criteria. In some embodiments, more than one attribute may be selected.

Now, referring to FIG. 4B, example construction of RPT table 120 will be described. Referring to FIG. 4B, RPT table 120 refers to a resource profile template for "JOB TITLE" attribute. Column 414 refers to various resource profile template identifications (or "RPT IDs"), column 416 refers to ATRIBUTE (in this case, "JOB TITLE"), column 418 refers to memory to be allocated (in GB) to the virtual machine, column 420 refers to a number of VCPUS (corresponding to attribute NUMVCPUS) to be allocated to the virtual machine. As an example, referring to row 422 of RPT table 120, resource ID of RPT-1 is assigned to an "ARCHITECT" with a corresponding memory to be allocated set at 8 GB and a number of VCPUS to be allocated set at 16. As another example, if JOB TITLE is not listed in the resource profile template, referring to row 424, a default value for the memory to be allocated and VCPUs to be allocated is set. In this example, default setting is 2 GB of memory and 2 VCPUS. As one skilled in the art appreciates, similar tables may be configured for other attributes, for example, attribute "DEPARTMENT".

EXAMPLE PROCESSES

Figure 5:
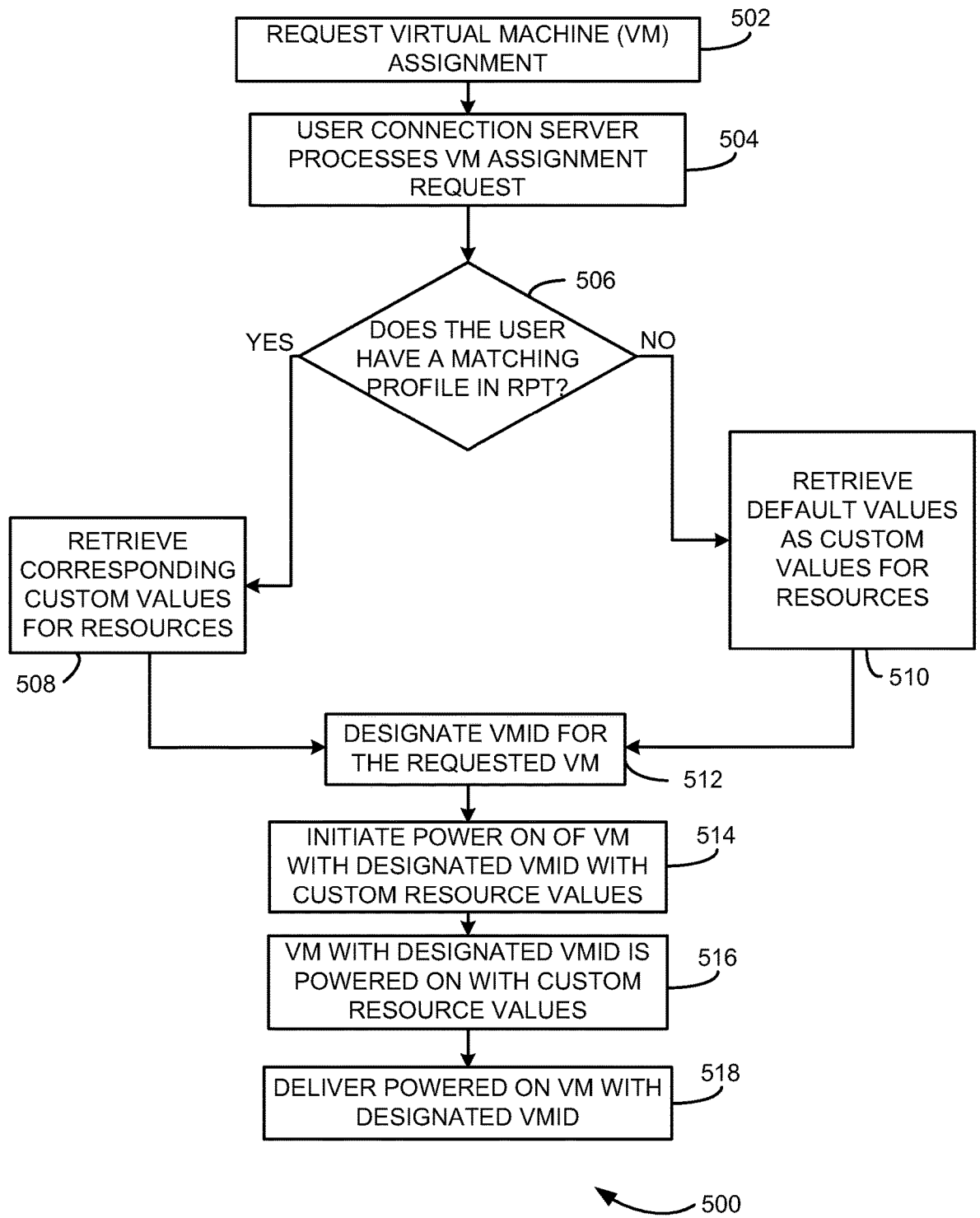
FIG. 5 illustrates an example flow diagram of a resource allocation operation, according to an example embodiment.

Now, referring to FIG. 5, exemplary operation of system 100 will be described with reference to flow diagram 500. Referring to flow diagram 500, in block 502, a user requests a virtual machine assignment. For example, a user logs into user client interface 110 and provides his or her credentials (for example, a user name and a password), to request assignment of a virtual machine. The user credentials are passed on to user connection server 102 for further processing.

In block 504, the virtual machine (VM) assignment request is processed. For example, user connection server 102 verifies the user credentials. In one embodiment, user connection server 102 accesses AD server 104 over link 114 to verify the user credentials to authenticate the user. User authentication using an active directory, or another directory service, is well known. In one embodiment, user connection server 102 receives information related to the user stored in active directory database 140. For example, data stored in user profile table 142 that corresponds to the user is received by user connection server 102. Now, user connection server 102 has details about the attributes of the user requesting the virtual machine. In one embodiment, the retrieved attributes of the user may be stored in UPT cache 121, for later use. This will be further described with reference to FIG. 5B.

In block 506, RCT and RPT tables are checked to see if they indicate the user's profile attributes entitle him to a custom VM. For example, user connection server 102 accesses RCT Table 119 to determine which attributes are selected for custom allocation of resources. For example, attribute "JOB TITLE" is selected as "YES" in RCT table 119. User connection server 102 can then use the specific job title of user FRED to query RPT table 120 that corresponds to attribute "JOB TITLE". In this example, user FRED's job title is an "ARCHITECT". Referring to an example RPT table 120 in FIG. 4B, corresponding custom resources to be allocated to user FRED is determined.

If there is a matching attribute listed in RPT table 120, in block 508, corresponding resource values are retrieved. For example, the job title "ARCHITECT" is listed in row 422 of RPT table 120. Corresponding custom resource values in row 422 are retrieved by user connection server 102. In this example, a memory of 8 GB and NUMVCPUS of 16 will be assigned to the virtual machine requested by user FRED.

If there is no matching attribute listed in RPT table 120, in block 510, default resource values are retrieved. For example, referring to RPT table 120 in FIG. 4B, resource values corresponding to "DEFAULT" in row 424 are retrieved. In this example, a memory of 2 GB and NUMVCPUS of 2 will be assigned to user FRED, if FRED's job title was not listed in RPT table 120.

In block 512, a virtual machine identification (VMID) is designated for the virtual machine request. For example, a VMID of "VM123" is designated to identify virtual machine to be assigned to user FRED.

In block 514, the power on of virtual machine with designated VMID is initiated. For example, user connection server 102 sends the request to power on a virtual machine with a VMID of "VM123" to management server 106. Management server 106 receives the request with designated VMID along with custom resource values for the virtual machine. If operation in block 508 was carried out, management server 106 receives the request with custom resource values that corresponds to the matching attribute (in this example, values corresponding to attribute "ARCHITECT"). If operation in block 510 was carried out, management server 106 receives the request with designated VMID along with retrieved resource values that corresponds to "DEFAULT" value as custom resource values.

It should be noted that the virtual machine may be selected from a pool of powered down but available persistent or non-persistent virtual machines. For example, the virtual machine may be non-persistent virtual machine that is randomly assigned to the user FRED or persistent virtual machine that is statically assigned to the user FRED. Non-persistent virtual machines are randomly delivered to users, while persistent virtual machines are guaranteed to be delivered to a specific user.

In block 516, the virtual machine with designated VMID is powered on (or booted) with the custom resource values. For example, management server 106 reviews the received request and identifies the request as requiring custom resource allocation for virtual machine "VM123". Resource allocation manager 124 then communicates with the VMPONc 150 process of host computer 108 and retrieves virtual machine configuration file VMXc 146. As previously described with reference to FIG. 2B, virtual machine configuration file VMXc 146 has a value of "CUSTOM" for fields NUMVCPUS and MEMSIZE. Resource allocation manager 124 retrieves all the field values from virtual machine configuration file VMXc 146 and replaces the custom value of "16" for field NUMVCPUS and custom value of "8" for field MEMSIZE. Updated virtual machine configuration file is sent to VMPONc 150 process to power on virtual machine "VM123", with the custom resource values. Example configuration file of virtual machine "VM123" is shown in FIG. 5A.

In block 518, the requested virtual machine is delivered to the user for use. For example, management server 106 may communicate to user connection server 102 that virtual machine with VMID of "VM123" is powered on. This message may be communicated to the user using user client interface 110.

As one skilled in the art appreciates, in some embodiments, a request to power on a virtual machine may be initiated without custom values for resources. As an example, user connection server 102 may communicate with management server 106 indicating that the power on request is a default power on request, without any custom values for the resources. Then resource allocation manager 124 may communicate with virtual machine power on process VMPON1 148 and request that a virtual machine be powered on using virtual machine configuration file VMX1 144. As previously described with reference to FIG. 2A, the virtual machine configuration file VMX1 144 has predefined values for various fields. Virtual machine power on process VMPON1 148 may use virtual machine configuration file VMX1 144 to power on a new virtual machine, with resources that correspond to the values stored in virtual machine configuration file VMX1 144.

Now, referring to FIG. 5A, an example virtual machine configuration file for virtual machine with VMID of "VM123", with custom values for fields NUMVCPUS and MEMSIZE is shown in screen shot 520. Now, referring to reference numeral 522, field NUMVCPUS is set to 16. Similarly, referring to reference numeral 524, field MEMSIZE is set to 8, indicating 8 GB of memory.

Figure 5B:
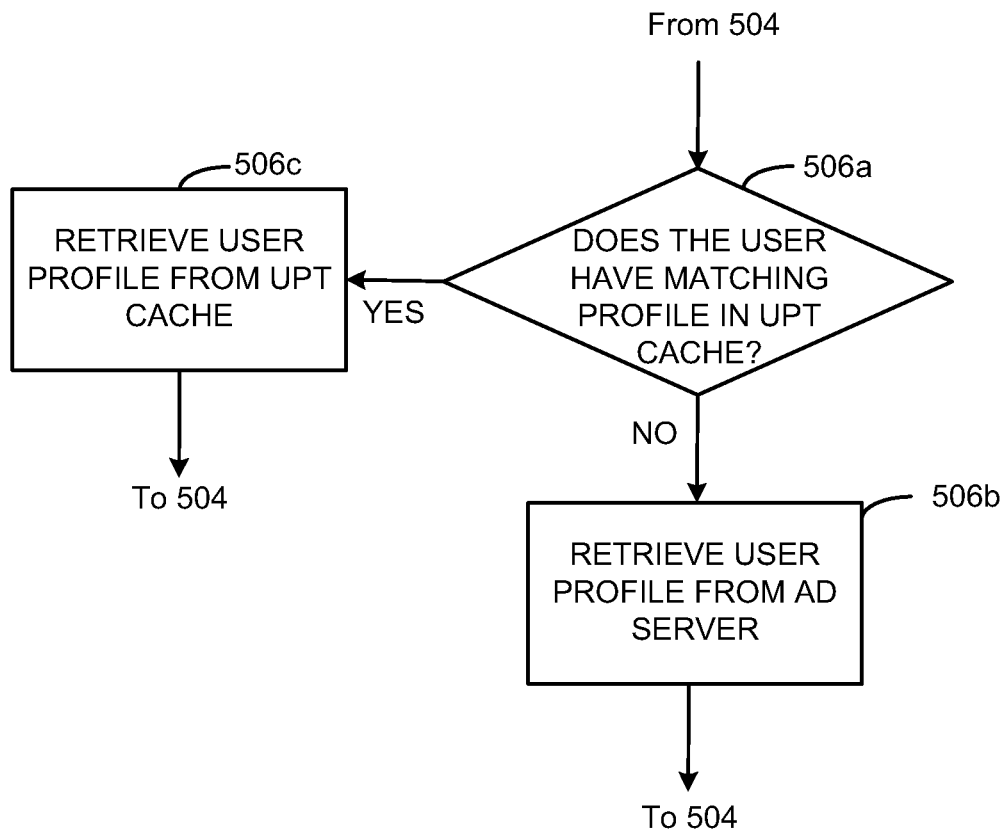
FIG. 5B illustrate a flow diagram for an alternate operation for resource allocation operation described with reference to FIG. 5, according to an example embodiment.

Now referring to FIG. 5B, an alternate example operation will be described. In this example, a previously retrieved user profile is maintained in user connection server 102. Now, in block 506a, UPT cache 121 is verified to check if corresponding user profile is available. If the user profile is available in UPT cache 121, in block 506b, the user profile will be retrieved from UPT cache 121. If the user profile is not available in UPT cache 121, then, in block 506c, user profile will be retrieved from AD server 104, as previously discussed.

If user profile is available in the UPT cache 121 there will be no need to access AD server 104 to get user profile. As one skilled in the art appreciates, in some embodiments, such a structure may provide for improved performance. For example, if a subsequent request for a virtual machine is received from user FRED, UPT cache 121 may be used to determine profile of user FRED.

As one skilled in the art appreciates, if user profile for a user is changed in AD server 104, for example, by updating a corresponding user profile table, a signal may be sent to user connection server 102 to indicate the change. In one example, user connection server 102 may delete corresponding entry for the user from UPT cache 121.

Although certain terms are used primarily herein, other terms could be used interchangeably to yield equivalent embodiments and examples. For example, it is well-known that equivalent terms in the field of system virtualization or similar or related fields could be substituted for such terms as "physical computer," "hypervisor," "virtual machine," or the like. Specifically, the term "hypervisor" may be used interchangeably with "virtual machine monitor," "virtual machine supervisor," "virtual machine manager," or the like. Likewise, the term "physical computing resource" can be used interchangeably with the terms "physical machine resource," "physical resource," "physical device," or the like. In addition, terms may have alternate spellings which may or may not be explicitly mentioned, and all such variations of terms are intended to be included.

Example embodiments described herein provide applications, tools, data structures and other support to implement a resource allocation manager or similar logic to be used to dynamically allocate physical resources amongst multiple virtual machines based on activities occurring thereon. Other embodiments of the described techniques may be used for other purposes or in other contexts. For example, although described embodiments operate with respect to system or platform virtual machines (e.g., as manage by a hypervisor or virtual machine monitor), the techniques may be applicable with respect to process virtual machines (e.g., the Java virtual machine) or process scheduling at the operating system level. Virtual servers may also be governed by similarly dynamic resource allocation methods, including considerations such as what user groups or numbers of users are using a given virtual server and in what context.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored in various data stores, can be available by standard mechanisms such as through C, C++, C #, and Java APIs; libraries for accessing files, databases, or other data repositories; through scripting languages such as XML; or through Web servers, FTP servers, or other types of servers providing access to stored data. Data stores and tables may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, RPC, RMI, HTTP, web services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of example systems described herein may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for dynamic resource allocation are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

What is claimed is:

1. A method for allocating physical resources of a host physical computing system to a virtual machine in a virtualized computing environment comprising at least the host physical computing system hosting multiple virtual machines, the method comprising:
   receiving, at a connection server, a request for allocation of the virtual machine, for a user;
   in response to receiving the request for allocation of the virtual machine for the user,
       retrieving, from a stored user profile corresponding to the user, a plurality of attribute values corresponding to attributes of the user;
       retrieving a virtual machine configuration file, the configuration file defining an allocation of the physical resources on the host physical computing system for the virtual machine, wherein the configuration file requires a custom resource value to define the allocation of at least one physical resource for the virtual machine;
       determining the custom resource value, comprising:
           determining an attribute value designated for custom allocation of resources from the retrieved plurality of attribute values corresponding to attributes of the user based on a resource configuration template table, wherein the resource configuration template table defines which attribute value of the user is designated for assigning the custom resource value;
           comparing the determined attribute value with a plurality of values designated for the custom allocation of resources in a stored table, wherein the stored table defines for each of the plurality of values designated for the custom allocation of resources, corresponding resource values for allocation of physical resources;
           when the determined attribute value matches a value designated for the custom allocation of resources in the stored table, retrieving a resource value corresponding to the matched value from the stored table and using the retrieved resource value as the custom resource value, wherein the stored table further includes a default resource value, wherein the default resource value is used for the custom resource value if the determined attribute value does not match any values designated for the custom allocation of resources in the stored table;
   designating a virtual machine identification (VMID) for the requested virtual machine; and
   booting the virtual machine with the designated VMID for access by the user, the virtual machine being booted with the allocation of physical resources of the host physical computing system defined by the configuration file with the determined custom resource value.

2. The method of claim 1, further including:
   assigning the virtual machine for the user, the assigned virtual machine having a virtual machine identification (VMID); and
   passing the VMID along with the configuration file with the determined custom resource value to the host computer for powering on the requested virtual machine.

3. The method of claim 2, further including powering on the requested virtual machine with the configuration file with the determined custom resource value.

4. The method of claim 1, wherein the step of retrieving, from the stored user profile corresponding to the user, a plurality of attribute values corresponding to attributes of the user further comprises retrieving the plurality of attribute values from the user profile stored in an active directory.

5. The method of claim 4, further including, checking a user profile template cache for the plurality of attribute values, before retrieving the plurality of attribute values from the active directory.

6. The method of claim 4, further including, storing the retrieved plurality of attribute values in a user profile template cache.

7. A non-transitory computer-readable storage medium including instructions that are configured, when executed by a computing system, to perform a method for allocating physical resources of a host physical computing system to a virtual machine in a virtualized computing environment comprising at least the host physical computing system hosting multiple virtual machines, the method comprising:

receiving, at a connection server, a request for allocation of the virtual machine, for a user;
in response to receiving the request for allocation of the virtual machine for the user,
retrieving, from a stored user profile corresponding to the user, a plurality of attribute values corresponding to attributes of the user;
retrieving a virtual machine configuration file, the configuration file defining an allocation of the physical resources on the host physical computing system for the virtual machine, wherein the configuration file requires a custom resource value to define the allocation of at least one physical resource for the virtual machine;
determining the custom resource value, comprising:
determining an attribute value designated for custom allocation of resources from the retrieved plurality of attribute values corresponding to attributes of the user based on a resource configuration template table, wherein the resource configuration template table defines which attribute value of the user is designated for assigning the custom resource value;
comparing the determined attribute value with a plurality of values designated for the custom allocation of resources in a stored table, wherein the stored table defines for each of the plurality of values designated for the custom allocation of resources, corresponding resource values for allocation of physical resources;
when the determined attribute value matches a value designated for the custom allocation of resources in the stored table, retrieving a resource value corresponding to the matched value from the stored table and using the retrieved resource value as the custom resource value, wherein the stored table further includes a default resource value, wherein the default resource value is used for the custom resource value if the determined attribute value does not match any values designated for the custom allocation of resources in the stored table;
designating a virtual machine identification (VMID) for the requested virtual machine; and
booting the virtual machine with the designated VMID for access by the user, the virtual machine being booted with the allocation of physical resources of the host physical computing system defined by the configuration file with the determined custom resource value.

8. The computer-readable storage medium of claim 7, further including assigning the virtual machine for the user, the assigned virtual machine having a virtual machine identification (VMID); and
passing the VMID along with the configuration file with the determined custom resource value to the host computer for powering on the requested virtual machine.

9. The computer-readable storage medium of claim 8, further including powering on the requested virtual machine with the configuration file with the determined custom resource value.

10. The computer-readable storage medium of claim 7, wherein the step of retrieving, from the stored user profile corresponding to the user, a plurality of attribute values corresponding to attributes of the user further comprises retrieving the plurality of attribute values from the user profile from an active directory.

11. The computer-readable storage medium of claim 10, further including, checking a user profile template cache for the plurality of attribute values, before retrieving the plurality of attribute values from the user profile stored in the active directory.

12. The computer-readable storage medium of claim 10, further including, storing the retrieved plurality of attribute values in a user profile template cache.

13. A computing system for allocating physical resources of a host physical computing system to a virtual machine in a virtualized computing environment comprising at least the host physical computing system hosting multiple virtual machines, the computing system comprising:
a physical user connection server configured to
receive a request for allocation of the virtual machine, for a user;
in response to receiving the request for allocation of the virtual machine for the user,
retrieve, from a stored user profile corresponding to the user, a plurality of attribute values corresponding to attributes of the user;
retrieve a virtual machine configuration file, the configuration file defining an allocation of the physical resources on the host physical computing system for the virtual machine, wherein the configuration file requires a custom resource value to define the allocation of at least one physical resource for the virtual machine;
determine the custom resource value, comprising:
determining an attribute value designated for custom allocation of resources from the retrieved plurality of attribute values corresponding to attributes of the user based on a resource configuration template table, wherein the resource configuration template table defines which attribute value of the user is designated for assigning the custom resource value;
comparing the determined attribute value with a plurality of values designated for the custom allocation of resources in a stored table, wherein the stored table defines for each of the plurality of values designated for the custom allocation of resources, corresponding resource values for allocation of physical resources;
when the determined attribute value matches a value designated for the custom allocation of resources in the stored table, retrieving a resource value corresponding to the matched value from the stored table and using the retrieved resource value as the custom resource value, wherein the stored table further includes a default resource value, wherein the default resource value is used for the custom resource value if the determined attribute value does not match any values designated for the custom allocation of resources in the stored table;
designating a virtual machine identification (VMID) for the requested virtual machine; and
a physical management server configured to boot the virtual machine with the designated VMID for access by the user, the virtual machine booted with the allocation of physical resources of the host physical computing system defined by the configuration file with the determined custom resource value.

14. The computing system of claim 13, wherein the physical user connection server assigns a virtual machine for the user, the assigned virtual machine having a virtual machine identification (VMID); and passes the VMID along with the configuration file with the determined custom resource value to the physical management server for powering on the requested virtual machine.

15. The computing system of claim 13, wherein the physical management server powers on the requested virtual machine with the configuration file with the determined custom resource value.

16. The computing system of claim 13, wherein the physical user connection server retrieves the plurality of attribute values from the user profile stored in an active directory server.

17. The computing system of claim 16, wherein the physical user connection server checks a user profile template cache for the plurality of attribute values, before the plurality of attribute values is retrieved from the user profile active directory server.

18. The computing system of claim 16, wherein the physical user connection server stores the retrieved plurality of attribute values in a user profile template cache.

* * * * *